No. 641,819. Patented Jan. 23, 1900.
B. F. BARNES.
ROLLER BEARING.
(Application filed June 3, 1899.)
(No Model.)
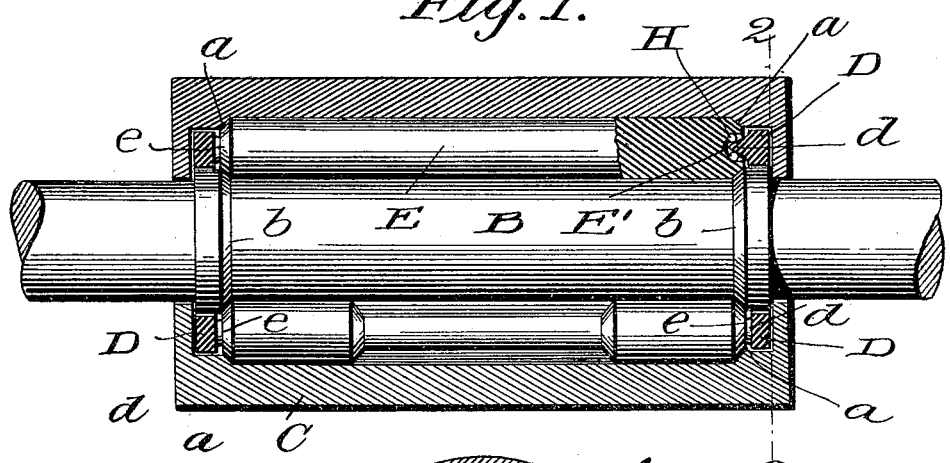
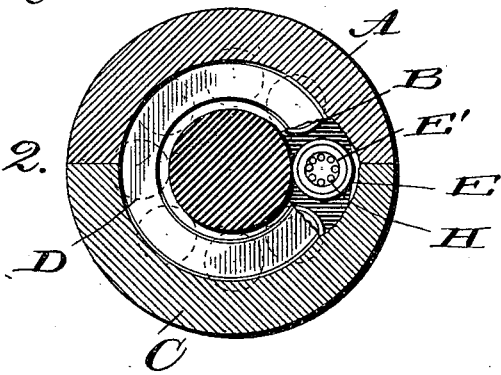
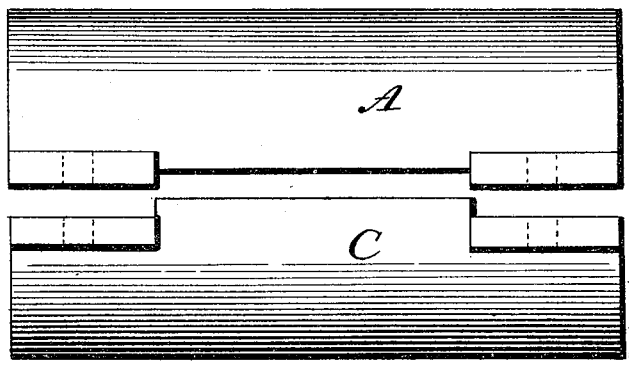
Witnesses
L. C. Hills,
A. L. Hough.
Inventor
B. F. Barnes,
By Franklin H. Hough
Attorney

UNITED STATES PATENT OFFICE.

BURR FRANK BARNES, OF JERSEY CITY, NEW JERSEY.

ROLLER-BEARING.

SPECIFICATION forming part of Letters Patent No. 641,819, dated January 23, 1900.

Application filed June 3, 1899. Serial No. 719,208. (No model.)

*To all whom it may concern:*

Be it known that I, BURR FRANK BARNES, a citizen of the United States, residing at Jersey City, in the county of Hudson and State of New Jersey, have invented certain new and useful Improvements in Roller-Bearings; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in roller-bearings for shafts of various kinds; and the object of the present invention is to generally improve upon the construction of rollers and to simplify and render more effective devices of this character.

More particularly, the invention consists in the provision of a series of cylindrical rollers which are adapted to be held within a boxing or hub adjacent to the spindle, said rollers having beveled ends adapted to contact with beveled shoulders on the spindle, each of said rollers being recessed at its end and adapted to have a bearing on a series of balls which contact with conical lugs held upon a supporting-ring within the boxing, whereby the amount of friction on the various moving parts is reduced to a minimum.

To these ends and to such others as the invention may pertain, the same consists in the novel construction, arrangement, and adaptation of parts, as will be hereinafter more fully described and then specifically defined in the appended claim.

My invention is clearly illustrated in the accompanying drawings, which, with the letters of reference marked thereon, form part of this application, and in which drawings similar letters of reference indicate like parts throughout the several views, in which—

Figure 1 is a vertical longitudinal section through a journal box and spindle equipped with my improved bearings. Fig. 2 is a sectional view on line 2 2 of Fig. 1. Fig. 3 is a side elevation of the journal-box sections.

Reference now being had to the details of the drawings by letter, A and C designate the two parts of the journal box or hub, whichever may be used in connection with the rollers, and the said parts forming the box or hub are recessed out interiorly, forming the beveled shoulders $a$ at each end, and B is the spindle, which has preferably the beveled shoulders $b$ at or near the ends of the box or hub. Mounted within the box-sections are the rings D, which have a series of conical lugs $d$ about the inner faces of said rings, the antifriction-rollers E having their outer edges, as at $e$, beveled where they are adapted to contact with the beveled portions A of the box or hub sections. Each of said rollers E has its ends recessed, as at E', to receive the lugs $d$. Interposed between said conical lugs and the walls of the recess of each roller is a series of antifriction-balls H, provided to reduce the friction between said lugs and the rollers.

From the foregoing it will be noted that the cylindrical roller-bearings while mounted on the cones between which and said rollers are disposed a series of balls to further reduce friction the edges of the rollers are beveled so as to contact against the beveled edges $a$ and $b$ on the inner circumference of the box-sections and the spindle, respectively.

Having thus described my invention, what I claim to be new, and desire to secure by Letters Patent, is—

A roller-bearing for spindles comprising in combination with the spindle having shoulders with their inner edges beveled, hub-sections one having a recessed edge in which a projecting portion of the other engages, the rings D held within said hub-sections, and about the circumferences of said shoulders, a series of conical bearing-lugs $d$ on said rings and the rollers having recessed ends in which said conical lugs engage, ball-bearings between the latter and the walls of the recesses in the rollers, the ends of the latter being beveled, and bearing against beveled edges of the hub and shoulders on the spindles, as set forth.

In testimony whereof I affix my signature in presence of two witnesses.

BURR FRANK BARNES.

Witnesses:
J. GARDINER SMITH,
WM. P. DUGAN.